United States Patent [19]

Fujiwara et al.

[11] Patent Number: 5,470,225
[45] Date of Patent: Nov. 28, 1995

[54] ATOMIZING TYPE BURNER

[75] Inventors: Hideyoshi Fujiwara, Machida; Naomi Ishikawa, Tokyo, both of Japan

[73] Assignee: Create Ishikawa Co., Ltd., Tokyo, Japan

[21] Appl. No.: 87,267

[22] Filed: Jul. 8, 1993

[30] Foreign Application Priority Data

Jul. 14, 1992 [JP] Japan ..................................... 4-208550

[51] Int. Cl.$^6$ ................................................. F23D 14/62
[52] U.S. Cl. ............................. 431/215; 431/210; 431/11; 431/354; 431/350
[58] Field of Search ..................................... 431/350, 353, 431/354, 355, 207, 210, 215, 219, 11, 181, 182, 187, 188

[56] References Cited

U.S. PATENT DOCUMENTS

| | | | |
|---|---|---|---|
| 821,419 | 5/1906 | Kemp | 431/187 |
| 1,402,747 | 1/1922 | Doble | 431/11 |
| 1,427,910 | 9/1922 | Quinn | 431/354 |
| 1,458,378 | 6/1923 | Astrom | 431/352 X |
| 1,612,457 | 12/1926 | Marron | 431/353 X |
| 1,925,183 | 9/1933 | Forster | 431/353 X |
| 2,212,004 | 8/1940 | Berthiaume et al. | 431/187 X |
| 2,461,731 | 2/1949 | Guth | 431/352 X |
| 2,989,118 | 6/1961 | Cleverdon | 431/11 |
| 3,588,304 | 6/1971 | Guth | 431/352 |
| 4,141,505 | 2/1979 | Reich | 431/187 X |
| 4,255,121 | 3/1981 | Sugimoto | 431/210 X |
| 4,347,052 | 8/1982 | Reed et al. | 431/188 |

FOREIGN PATENT DOCUMENTS 2638878  3/1978  Germany ............................. 431/352

*Primary Examiner*—Carl D. Price
*Attorney, Agent, or Firm*—Ronald P. Kananen

[57] ABSTRACT

An atomizing type burner comprises an air supply tube (11,103) for supplying an air, a combustion cylinder (104, 114,115) connected to the open end of the air supply tube (11,103), a fuel supply tube (102) for supplying a fuel at least partially placed in the air supply tube (11,103), a fuel atomizing nozzle (101) formed in the shape of a funnel and connected to the open end of the fuel supply tube (102), a passage formed by the air supply tube (11), the combustion cylinder (104), the fuel supply tube (102) and the fuel atomizing nozzle (101), and a small clearance portion formed in the passage near the fuel atomizing nozzle (101). The small clearance portion is nallower than the front and the rear portions of the passage so as to function as an atomizer.

8 Claims, 7 Drawing Sheets

1

ATOMIZING TYPE BURNER

BACKGROUND OF THE INVENTION

This invention relates to a burner to be used in a combustion equipment for liquid fuels, for instance, a waste oil. More particularly this invention relates to a burner in which liquid fuels can be completely burned not by being forcedly injected but by being atomized in a principle of atomiser.

There are some conventional combustion methods for burning liquid fuels, for instance, a petroleum. Namely, a method to stock a predetermined amount of fuel in a pan, e.g. a tank, to suck the fuel therefrom to a wick by capillarity so as to burn it, a method to burn a fuel which is atomized with air by pumping force (pressure atomization method), a method to burn a fuel which is vaporized by heating, a method to burn a fuel which is atomized by centrifugal force, or atomized by centrifugal force simultaneously being heated (centrifugal atomization method), and, a combination method to burn a fuel combined with other fuels are known. The pressure atomization method and centrifugal atomization method are frequently used among them.

A conventional combustion equipment of pressure atomization type does not trouble many times and is applied to various kinds of combustion devices for treating various kinds of liquid fuels. However, it is hard to control the air-fuel ratio. In case of burning a heavy oil, particularly a waste heavy oil containing many solid particles such as sludges for instance, it is easily occured that the oil is incompletely burned and the nozzle is blinded by the particles. On the other hand, a conventional combustion equipment of centrifugal atomization type can easily carry out complete combustion, but is not suitable for a heavy and viscous liquid fuel, either. Particularly in case of said heavy oil, the particles may adhere to a centrifugal vaporizer and a nozzle thereby disturbing vaporization and dispersion of the oil. And the combustion equipment of this type cannot be applied to a certain kind of combustion furnace because of its structural matter, and it may easily get out of order. Utility model laid-open No. 63-179426 discloses a combustion equipment wherein the fuel flow is automatically controlled in proportion to the air flow by a principle of atomizer. It can overcome said problems to some extent but is not suitable for a heavy liquid fuel and waste oil, either.

DESCRIPTION OF THE INVENTION

An object of the invention is to provide an atomizing type burner in which even if viscous liquid fuel containing solid particles such as a heavy waste oil for instance can be naturally atomized and be completely burned.

An atomizing type burner according to the invention comprises an air supply tube for supplying an air, a combustion cylinder connected to the open end of the air supply tube, a fuel supply tube for supplying a fuel at least partially placed in the air supply tube, a fuel atomizing nozzle formed in the shape of a funnel and connected to the open end of the fuel supply tube, a passage formed by the air supply tube, the combustion cylinder, the fuel supply tube and the fuel atomizing nozzle, and a small clearance portion formed in the passage near the fuel atomizing nozzle. The small clearance portion is nallower than the front and the rear portions of the passage so as to function as an atomizer. Therefore when an air flows through the nallow portion of the passage, once its pressure is increased to some degree and its flow velocity is increased, and its pressure is suddenly decreased immediately after passing the nallow portion of the passage, whereby the liquid is effectively atomized and completely burned.

The fuel atomizing nozzle is placed on the central axis of the air supply tube. The combustion cylinder is connected to the opening of the air supply tube. The clearance between the nozzle head and the combustion cylinder is restricted to be much smaller than the front and the rear areas thereof so that the air flows much faster than in the front and the rear areas thereof. When Bernoulli's theorem (100) is applied to the air flow passing near the clearance, the pressure of the air is to be suddenly reduced when passing through the small clearance.

$$\frac{V^2}{2} + \int \frac{dP}{\rho} + K = \text{const.} \text{ --- (100)}$$

$$\left( \begin{array}{ll} \text{wherein} \quad V \text{ is velocity,} & P \text{ is pressure,} \\ P \text{ is clensity,} & K \text{ is potential of} \\ & \text{external force} \end{array} \right)$$

Therefore, a liquid fuel in the fuel atomizing nozzle is sucked, dispersed and atomized into the air flow, thereby the liquid fuel is completely burned in a flame extending into a combustion channel of the combustion cylinder.

The atomizing type burner according to the present invention can be applied to an apparatus for treating a combustible liquid containing a combustible liquid and water which comprises a furnace, a heat exchanger connected to the furnace for receiving a hot gas or exhaust gas produced in the furnace and heating the combustible liquid so as to vapourize the water, a generator connected to the heat exchanger for generating the vapourized water, a first heater placed at the furnace and connected to the generator for heating the vapourized water so as to be dried before it enters into the furnace. The inventive burner is to be placed at the furnace for burning the fuel, thereby the combustible liquid mixed with the vapourized water can be burned in the furnace.

In a preferred mode of the apparatus, the generator includes an intake port formed in a side wall portion of the generator at a predetermined level so as to supply the combustible liquid. The heat exchanger is connected via a hot gas channel or exhause gas line to the furnace, and a preheating chamber is formed at the hot gas channel for preheating air to be fed into the burner. The clearance is formed between the combustion cylinder and the inventive nozzle in such a manner that a fuel in the nozzle is sucked when the air flow through the clearance into the combustion cylinder. An air conduit is connected with the preheating chamber with the burner. A blower is placed in an intermediate portion of the air conduit for blowing the air into the burner. A first tank contains the fuel, to which the nozzle is connected so that the fuel can be fed from the first tank into the nozzle. A second tank contains the combustible liquid, to which the heat exchanger is connected so that the combustible liquid can be fed from the second tank into the heat exchanger.

The generator includes an intake port formed in a side wall portion of the generator at a predetermined level so as to supply the combustible liquid, and the intake port is connected to the first tank so that the combustible liquid in the generator can be fed into the first tank.

In a further mode of the apparatus, it includes means for intaking selectively the combustible liquid in the generator and feeding it into the burner.

In another mode of the apparatus, the first heater is heated by the inventive burner within the furnace. The inventive burner includes the cylindrical combustion cylinder and the fuel atomizing nozzle placed in the combustion cylinder. The nozzle is formed in a funnel shape at its head so as to form a clearance between the combustion cylinder and the nozzle in such a manner that the fuel in the nozzle is atomized when the air flows through the clearance into the furnace. The first heater has openings for jetting the vapourized water with the combustible liquid into the furnace. A second heater is provided to heat the fuel in the first tank. The hot gas channel is formed in the shape of a funnel having a large-diater end portion joined to the heat exchanger and a small-diameter end portion joined to the furnace.

In another mode of the apparatus, three steps of heating, vapourizing and burning are completely closed in the treating apparatus so that the oil can be burned without discharging thereof into the atmosphere. The heat energy produced during the steps is utilized so as to separate the oil from the water. Thus separated oil or condensed oil containing a small percentage of water, for instance, 30 wt. % or less, is used as a fuel which is burned at the burner. Therefore, both of waste oils containing small water and waste oils containing large water can be treated. The steam or vapourized water produced in the generator is fed into the furnace and then discharged out of the apparatus so as to avoid pollution of oil smell.

The inventive burner is constructed so as to suck the fuel in the atomizing nozzle when it enters into a furnace with an air, it is not necessary to forcedly pump the fuel under high pressure into the nozzle so as to jet the fuel into the furnace. The fuel is effectively atomized at the nozzle whereby it can be perfectly burned.

Because the first heater heats the vapourized water with the oil before it enters into the furnace, the oil can be perfectively burned without smell and smoke. Thus produced hot gas or exhaust gas is fed into the heat exchanger for heating the waste oil containing a lot of water, for example, more than 90%. As a result, the water is vapourized in the generator joined to the heat exchanger so as to produce a hot steam with oil whereby it can be easily burned.

According to the best mode of the apparatus, waste oils can be perfectly treated so that any part thereof is never discharged out of the apparatus. No pollution can be accomplished at a low cost. Even waste oils can be used as a fuel.

According to another mode of the apparatus, an apparatus treats two kinds of waste oils, one of which contains a lot of water, for example, more than 90%, and the other of which contains a small quantity of water, for example, less than 30%. The latter is used as a fuel. A furnace has a lower portion, an upper portion and a side portion extending between the lower portion and the upper portion. The burner is placed at the lower portion of the furnace for burning the fuel. A heat exchanger is connected to the furnace for receiving heat from a hot gas produced in the furnace and heating the waste oil containing a lot of water so as to vapourize the water. A generator is connected to the heat exchanger for generating the vapourized water. A heater is placed at the upper portion of the furnace and connected to the generator for heating the vapourized water so as to be dried before it enters into the furnace.

DESCRIPTION OF THE EMBODIMENTS

Figure 7:
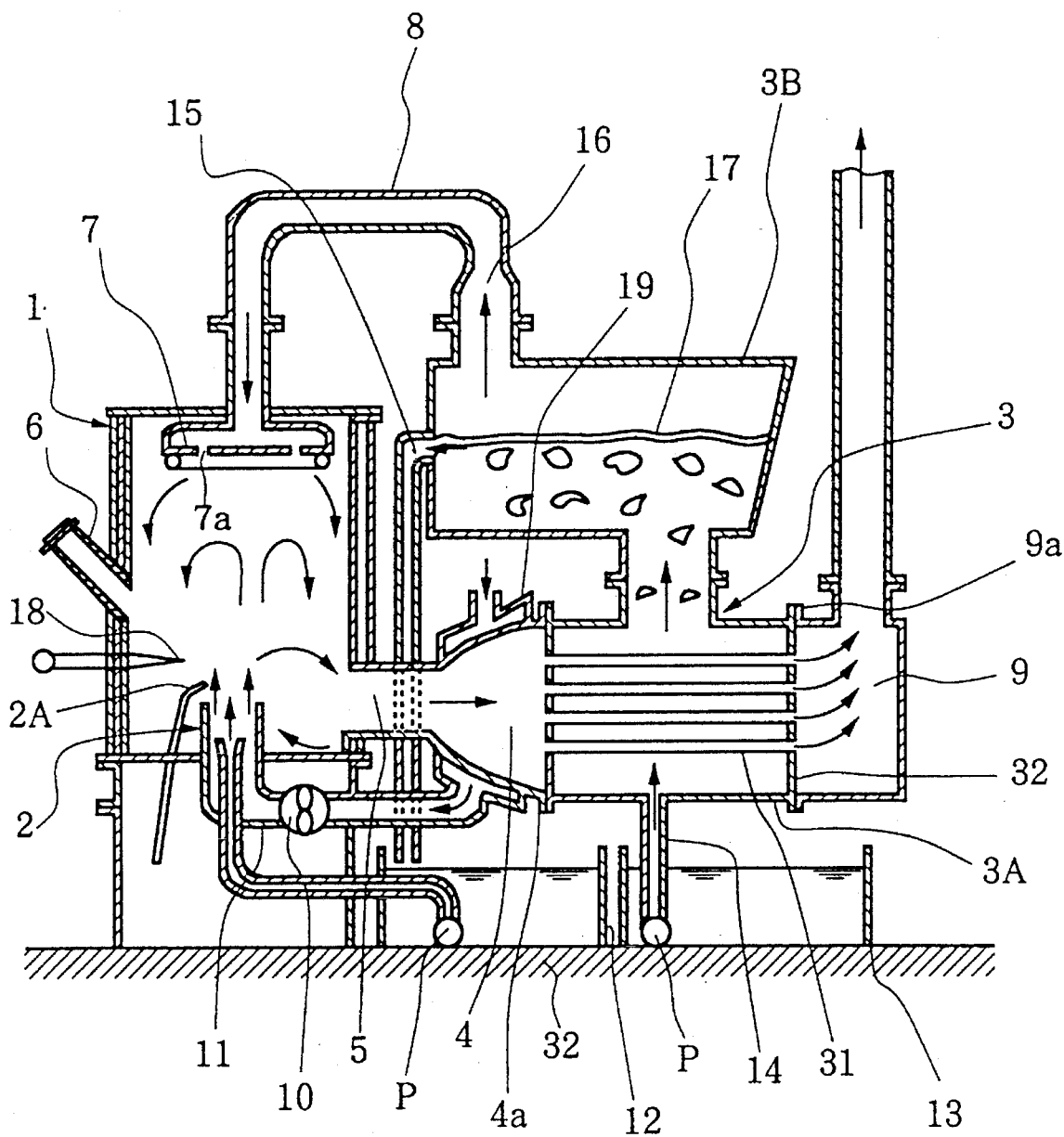
FIG. 7 is an explanately view showing a combustion apparatus for waste oils having an inventive burner applied thereto.

FIG. 7 is a explanately view showing a treating apparatus in which an atomizing type burner applied is according to the present invention. The treating apparatus includes a cylindrical combustion furnace 1, an atomizing type burner 2 placed on a central portion of a base of the furnace 1, and a generating device 3 connected via a hot gas channel 4 to a lower side wall portion of the furnace 1 where a port 5 is formed. The generating device 3 includes a heat exchanger 3A and a generator 3B. An observing or inspection port 6 is formed at a side wall portion of the furnace 1 opposite to the hot gas port 5. A heater 7 is placed at an upper wall portion of the furnace 1.

The hot gas channel 4 is formed in the shape of a funnel and has a small-diameter end portion joined to the port 5 and a large-diameter end portion joined via a flange 4a to the heat exchanger 3A of the generating device 3. The heat exchanger 3A is connected to the generator 3B placed above the heat exchanger 3A. A top port 16 is formed in an upper wall of the generator 3B so as to send generated steam or vapourized water containing vapourized oil or the like into the heater 7 within the furnace 1. The port 16 of the generator 3B is connected via a conduit 8 to the heater 7.

The heat exchanger 3A includes a cylindrical casing, a plurality of heat exchanging tubes 31 extending therein in parallel to each other and fixed to an end plate 32, and an exhaust hood 9 positioned at an end thereof opposite to the hot gas channel 4. The exhaust hood 9 is joined via a flange 9a to the right end of the tubes 31. The exhaust hood 9 is connected to a funnel through a proper cleaning means, if desired, before the exhaust gas is discharged out of the apparatus.

The atomizing type burner 2 according to the invention includes a combustion cylinder 104 and an atomizing nozzle 101 arranged therein. The combustion cylinder 104 is joined to an air supply tube 11. A blower 10 is placed in an intermediate portion of the air supply tube 11. The nozzle 101 is formed in the shape of a funnel and connected via a fuel supply tube 102 to an oil pump P. The combustion cylinder 104 and the nozzle 101 are arranged so as to form a flow according to Bernoulli's theorem. A clearance between the inner wall of the combustion cylinder 104 and the outer end of the nozzle 101 is set to be small so as to function as an atomizer so that an atomized fuel is produced at a high speed whereby the fuel can be easily burned. As the air is supplied at a high speed into the combustion cylinder 104 through the small clearance between the combustion cylinder 104 and the nozzle 101, a space in the tip portion of the nozzle 101 is slightly vacuumed so as to intake the fuel.

A ring type preheating chamber 19 is formed on the periphery of the hot gas channel 4 so as to preheat air before it is introduced into the air supply tube 11.

A tank 12 is placed below the hot gas channel 4 and contains fuel which is to be fed into the nozzle 101 by means of the pump P.

A further tank 13 is placed below the heat exchanger 3A and contains combustible liquid including a lot of water. Examples of the combustible liquid are waste oil, bilge, vegetable oil, paint and varnish, solvent, toluole, mineral oil and others.

A riser 14 has a lower end connected via a pump P to the tank 13 at its bottom and an upper end joined to a lower portion of the heat exchanger 3A whereby the combustible liquid can be fed from the tank 13 into the heat exchanger 3A. The combustible liquid further moves upwards among the heat exchange tubes 31 through the heat exchanger 3A and then flows into the generator 3B in the direction of arrows.

An intake port 15 is formed in a side wall portion of the generator 3B at a predetermined level. The oil or the like flows into the intake port 15 because of its low specific gravity in comparison with the water and is then fed into the tank 12. A further tank can be provided so as to receive the oil or the like from the intake port 15 of the generator although not shown.

It is preferable that a heater (not shown) is placed at the container 12 so as to heat the fuel contained therein. In such a case, fuel oil C, lubricating oil or the like can be easily burned at the burner 2. Also, a heater can be provided in order to heat the combustible liquid in the tank 13.

In operation, a fuel is set in the tank 12 while the combustible liquid containing a lot of water such as waste oil is set in the tank 13. A motor (not shown) for the blower 10 is switched on. After the pump in the tank 12 starts, the burner 2 is ignited by an auxiliary or pilot burner 2A. An operator (not shown) observes through the inspection window 6 how it is producing a flame while he adjusts the flow rate of air which is fed into the combustion cylinder 104 by means of the blower 10. The temperature in the furnace 1 is detected by a thermo couple 18 fixed to the side wall portion of the furnace 1 below the inspection window 6. The inner tip of the thermo couple 18 can be observed through the inspection window 6.

When a proper burning condition is maintained for a predetrmined period of time, the temperature in the furnace 1 reaches up to a desired value. The hot gas or exhaust gas produced in the furnace 1 flows through the hot gas channel 4 into the heat exchange tubes or pipes 31 and then comes into the exhaust hood 9.

Next, the pump in the tank 13 starts so as to pump the combustible liquid containing a lot of water from the pump into the heat exchanger 3A. When the combustible liquid moves up and/or remains in the heat exchanger 3A, it receives heat from the hot gas via the heat exchange pipes 31. As a result, the combustible liquid is heated. When the water contained in the combustible liquid is heated near or to its boiling point, it is vapourized in the generator 3B so as to generate steam or vapourized water in the generator. The vapourized water or steam moves up through an uppermost oil layer 17 which is always positioned as a top layer because of its low specific gravity. The steam with some oil and its smell is fed through the steam conduit 8 into the heater 7 in the furnace 1 while the heater 7 is heated by a flame produced by the burner 2. Thus, before the vapourized water enters into the furnace 1, it is heated by the heater 7 so as to be dried up. Thus dried steam mixed with some oil is jetted into the furnace 1 through small jet openings 7a formed in the heater 7 and then burned completely by the flame of the burner 2 when it flows down along the inner wall of the furnace 1. The exhaust gas is sent through the hot gas channel 4 and the heat exchange pipes 31 into the exhaust hood 9 and then discharged out of the apparatus after it is cleaned.

The air for fuel is supplied via the preheating chamber 19, the air conduit 11 and the air blower 10 into the burner 2. When the air flows via the clearance between the combustion cylinder 104 and the atomizing nozzle 101 into the interior of the combustion cylinder 104, the funel-shaped space outside the nozzle 101 is vacuumed to some degree. Thus, even if the pumping force of the pump in the tank 12 is weak, the fuel can be atomized at the tip of the nozzle 101.

Because the water in the heat exchanger 3a and the generator 3B is heated so as to be vapourized, the oil mixed with water is condensed in the generator 3B. Only oil or a combination of oil and very small water flows via the intake port 15 into the tank 12 whenever it reaches to a predetermined level.

An apparatus for burning waste oil comprising an atomizing type burner according to the present invention can be installed not only on a ground but also on a boat, a ship, a vehicle or any other place.

The atomizing type burner according to the invention will be further explained with reference to FIGS. 1–6,8–10.

Figure 1:
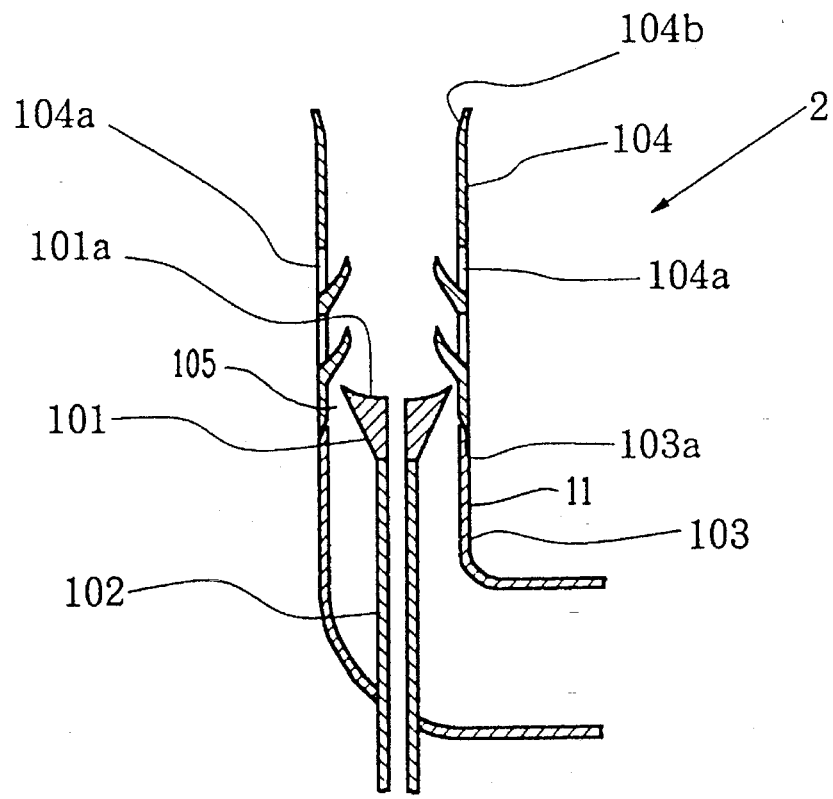
FIG. 1 is an explanately view showing a first embodiment according to the invention.

FIG. 1 is a vertical sectional view showing a first embodiment according to the invention. A fuel atomizing nozzle 101 has a channel formed in its central portion. The nozzle 101 is formed in the shape of a funnel. An air supply tube 11 is provided for supplying an air for fuel. The nozzle 1 is placed on the central portion of a opening 103a of the air supply tube 11. The nozzle 101 is connected to a fuel tank via a fuel supply tube 102. An oil in the tank is heated upto a predetermined temperature if necessary according to its property, for instance, a heavy oil or waste oil, and then the fuel oil is supplied to the nozzle 101 via the fuel supply tube 102. A combustion cylinder 104 is connected to the opening 103a and it surrounds the nozzle 101. A small clearance 105 is defined by the inner surface of the combustion cylinder 104 and the tip edge 101a of the nozzle. A plurality of openings 104a are formed on the side wall of the combustion cylinder 104.

Figure 2:
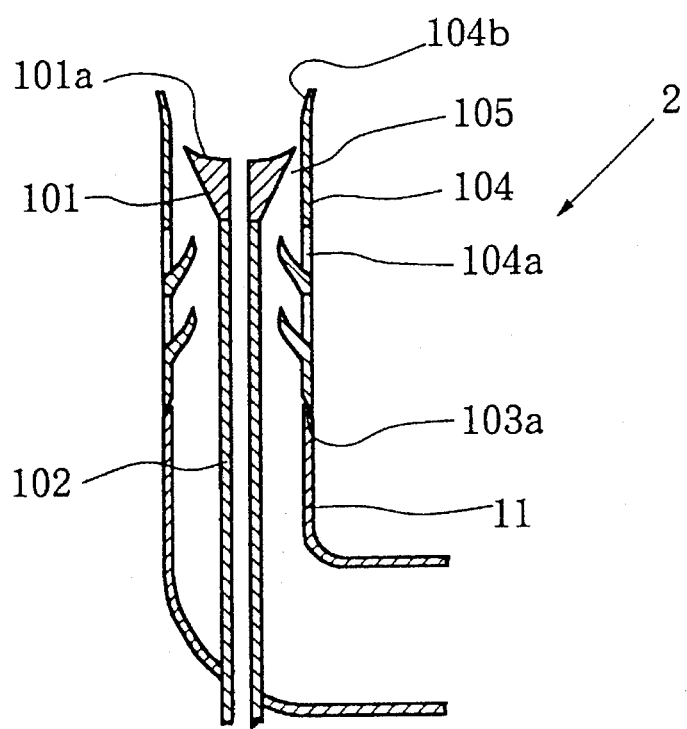
FIG. 2 is an explanately view showing a modified embodiment of the first embodiment.
Figure 3:
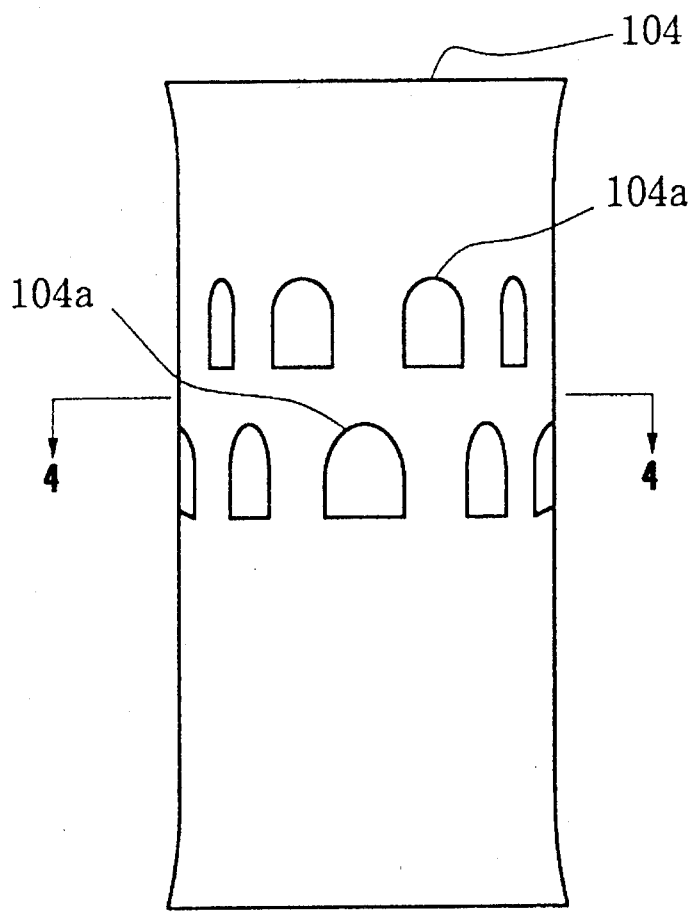
FIG. 3 is a side view showing a combustion cylinder in the first embodiment.
Figure 4:
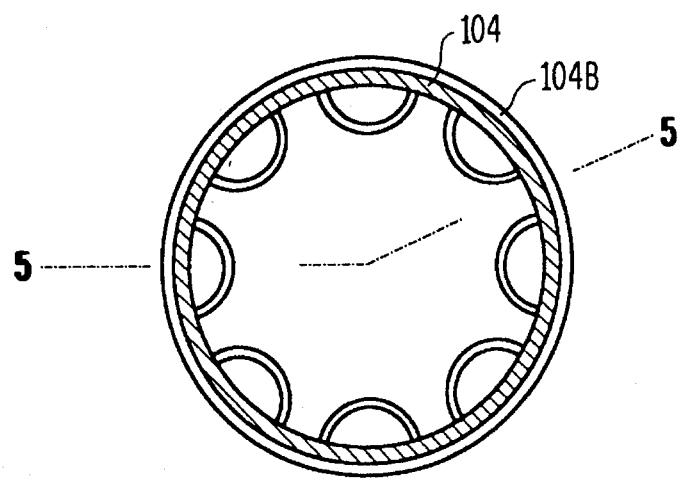
FIG. 4 is a sectional view showing a combustion cylinder in the first embodiment.
Figure 5:
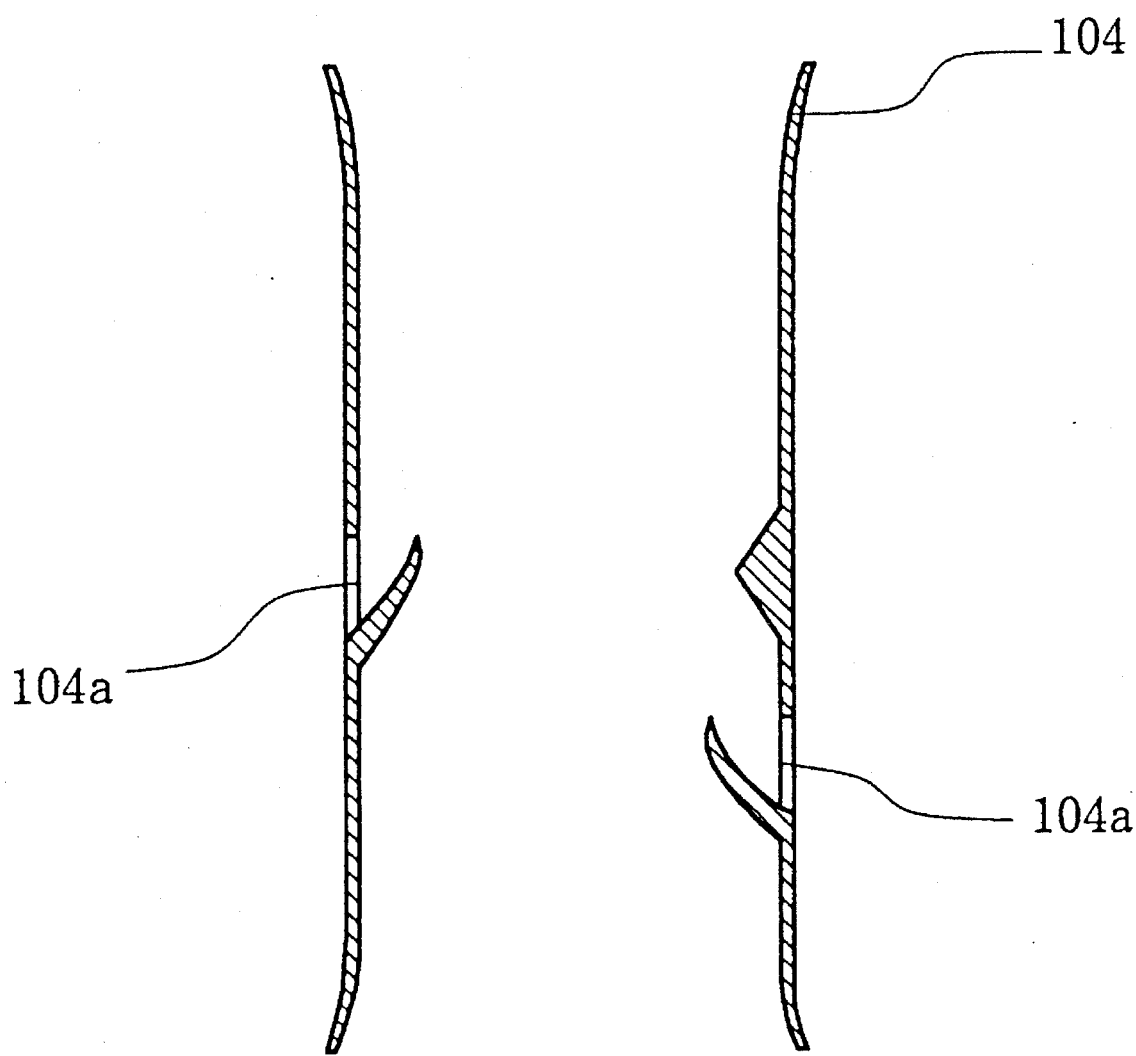
FIG. 5 is a explanately sectional view taken along the line A—A in FIG. 4 showing the combustion cylinder.

Now a pilot burner is ignited and an air is forcedly supplied by, for example, a blower to the air supply tube 102. The air slightly before the small clearance 105 is pressurized and then flows at high speed through the small clearance so that according to Bernoulli's theorem the space near the tip of the nozzle is vacuumed to some degree. Thus the fuel in the nozzle is easily atomized. In this manner the pressure required for supplying the fuel is very low, practically it is sufficient to merely keep the fuel level at the top of the nozzle. Thus, the fuel is easily atomized and mixed by the air. The fuel begins to burn when ignited by the piolt burner. As shown in FIG. 2, the fuel atomizing nozzle 101 can be placed above the openings 104a of the combustion cylinder. The opening 104a is formed, for instance, by punching. And the cutout poriton projects inwards form the inner surface of the cylinder 104. Separate projects may be fixed on the cylinder 104 as shown in FIGS. 3–5.

Figure 6:
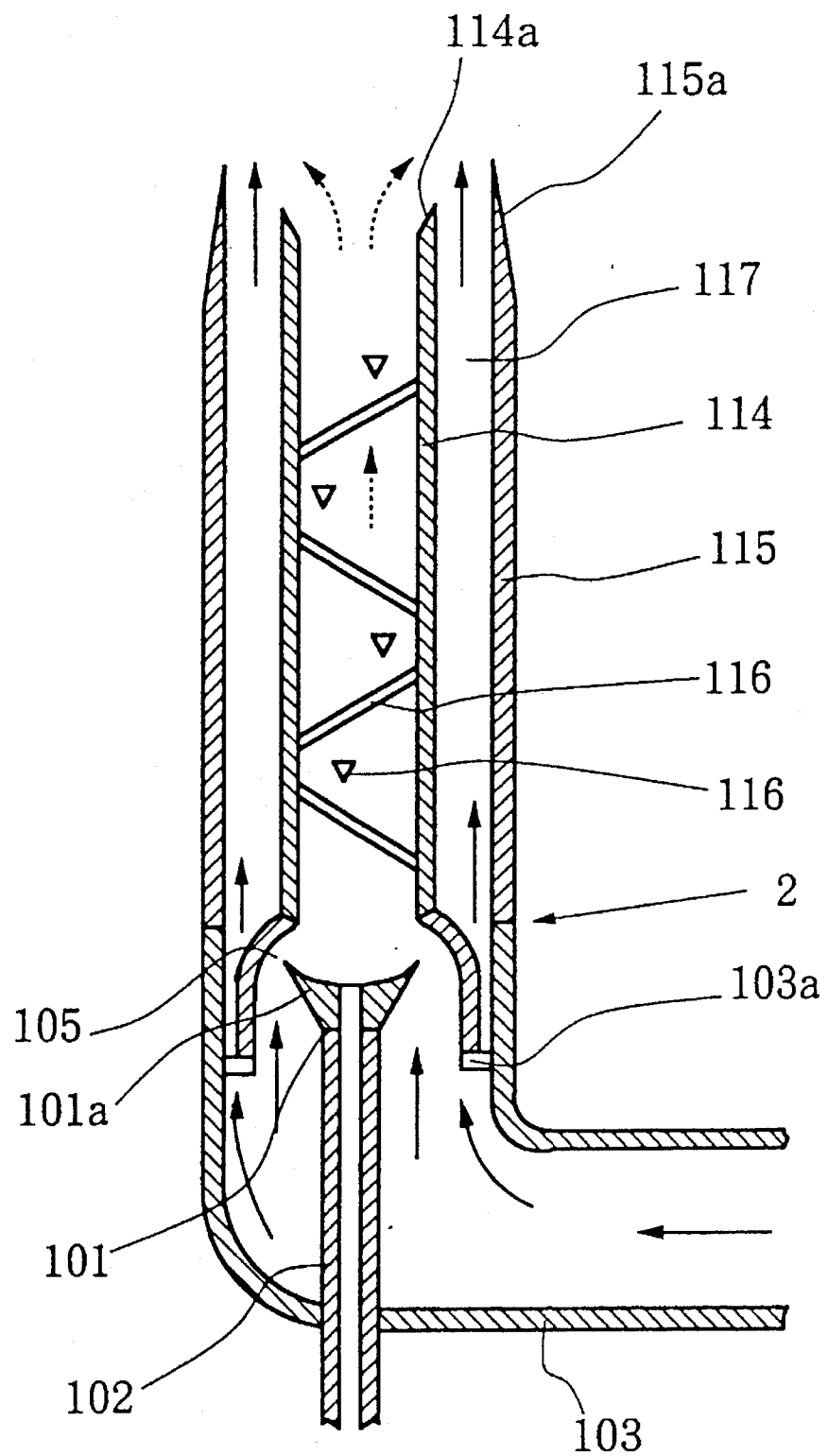
FIG. 6 is an explanately view showing second embodiment according to the invention.

FIG. 6 shows another embodiment of the invention, wherein the combustion cylinder is double type. If the combustion cylinder shown in FIG. 1 is used long time, carbides may be adhered at a portion near the tip 104b. The double type combustion cylinder is to prevent such an adhesion. An air supply tube 103 is formed in double type at its end portion. The funnel-shaped head of the fuel atomizing nozzle 101 is located at the central portion of the inner tube opening 103a of the air supply tube 103. An inner combustion cylinder 114 is provided so as to surround the fuel atomizing nozzle 101. A small clearance 105 is defined by the inner cylinder 114 and the periphery 101a of the nozzle tip. An outer cylinder 115 is placed on the outer tube opening 103b of the air supply tube 103 so as to form a double construction. An air conduit 117 is formed between the inner cylinder 114 and the outer cylinder 115. A static mixer 16 is provided in the inner cylinder 114. Thus an atomizing burner 2 is formed. In this double combustion tube, the end surface 114a of the inner cylinder 114 tapers outwards. The tip 115a of the outer cylinder coinsides with the extension of the tapered surface. An end surface 115a of the outer cylinder 115 tapers inward.

In this embodiment, even if a heavy waste oil can be used as a fuel which containing many solid particles. The solid particles are mixed and stirred in air flow by the static mixer 116 so as to be refined. Thus the solid particles are regulary mixed with air and dispersed thereby complete combustion is performed. A flame near the inner cylinder tip 114a burns in such a manner that it is drawn into the air flow through the outer cylinder 115 flowing at larger speed than that through the inner cylinder, and there is no sudden temperature change at the tip so that carbides will not be generated.

Figure 8:
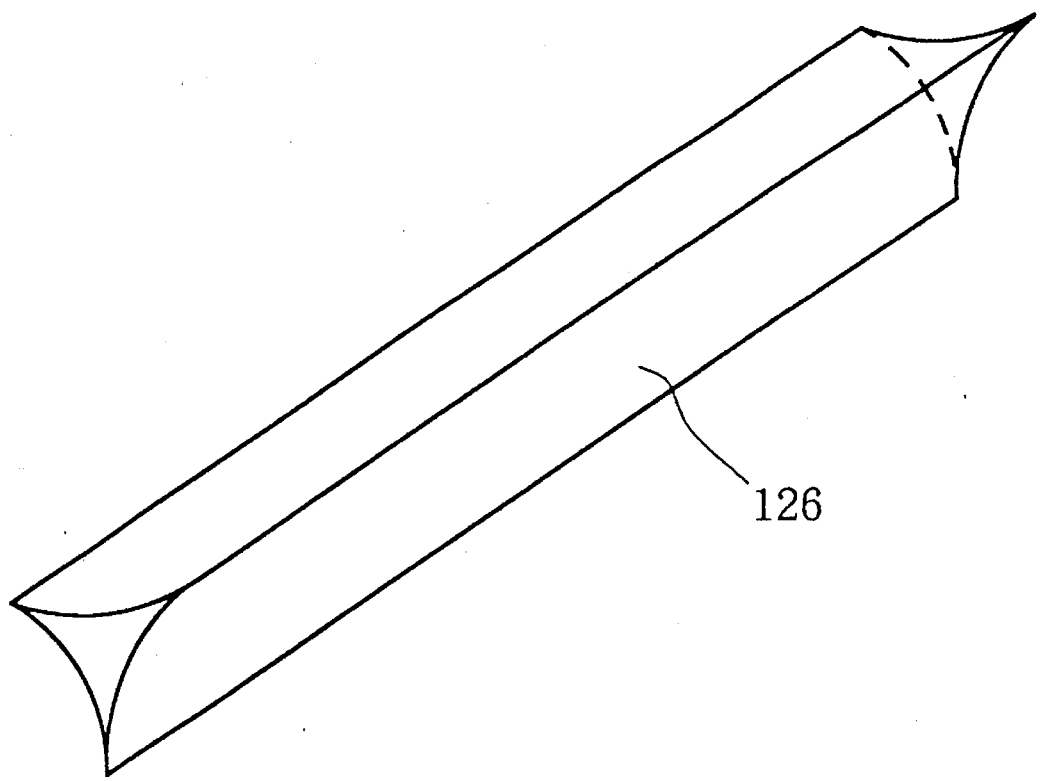
FIG. 8 is an explanately view showing an element of a static mixer.
Figure 9:
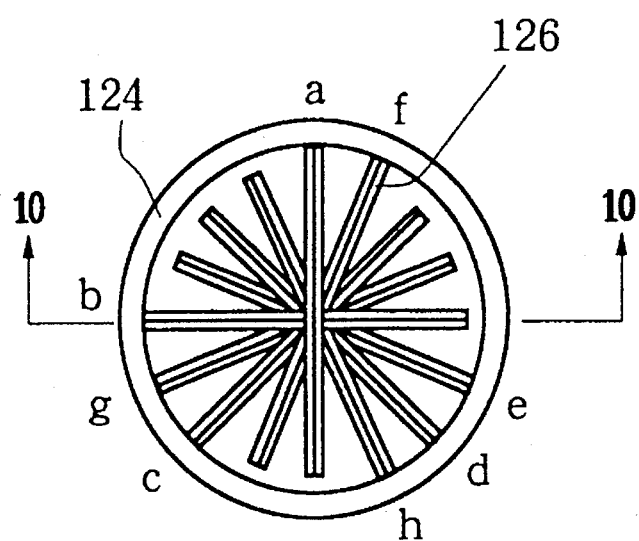
FIG. 9 is a bottom view showing a condition in which the elements are arranged.
Figure 10:
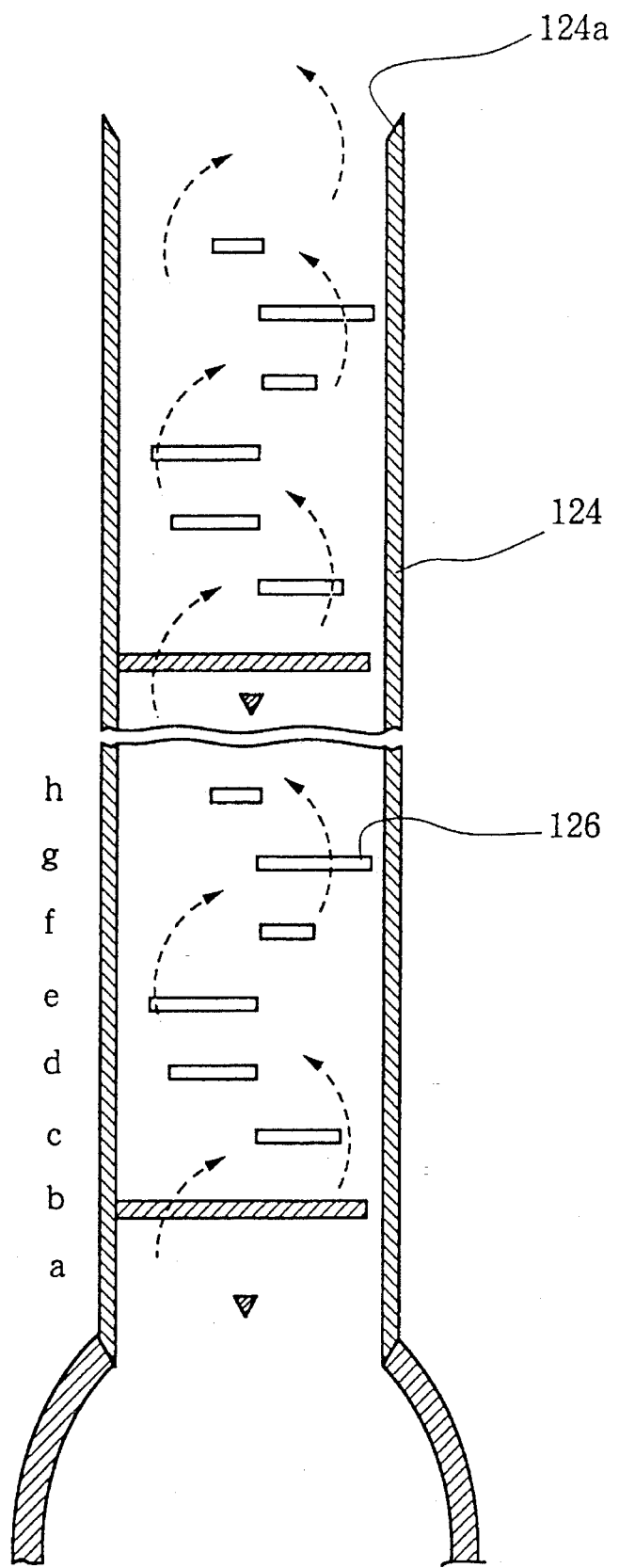
FIG. 10 is a explanately sectional view taken along the line B—B in FIG. 9 showing a combustion cylinder.

A static mixer is formed by bars 126 each being a curved triangle in cross section as shown in FIG. 8. The first and second elements (a),(b) are, for example, located so as to be crossed each other by right angle. The third element (c) is, for example, placed in the middle portion between the first (a) and second elements (b), or displaced from each of them by 45 degrees. Each bars is arranged in such a manner that its sharp edge directs downward. And this arrangement is repeated vertically as shown in FIG. 9. Each bars 126 is fixed at one end to the inner wall of the cylinder 114. And the bars 126 are arranged in a spiral manner so as to form a spiral flow. Such a static mixer is suitable for a viscous waste oil containing many residual particles. In the static mixer a clockwise or a counter-clockwise swing flow is generated and the residual particles are refined so that complete combustion is performed. The inventive burner has not a restricting end chip which is used in conventional nozzle for forced atomization but at its central portion a reverse cone nozzle, thereby a larger atomization effect is realized. Therefore the fuel oil is naturally atomized, mixed with air and completely burned. The inventive burner was applied to the combustion apparatus for treating a waste oil, and it was certified that the waste oil was completely burned at high efficiency and that the apparatus is useful for controling pollution. The waste oil was burned by the inventive burner in the combustion furnace 1. The oil containing a lot of water is supplied from the tank 13 to the heat exchanger 3A and is heated. Water contained in the oil is separated therefrom in the generator 3B. The vapourized water with some oil and its smell is supplied to the combustion furnace 1 and is burned. The oil was burned in the completely burning flame, and passed through the heat exchanger 3A and exhausted from the stack with no smell and no smoke. On the other hand the separated oil was mixed with the waste oil in the tank 12 and used as a fuel without any troubles.

In accordance with the invention a liquid fuel is atomized by atomization effect based on Bernoulli's theorem so that the fuel is atomized in proportion to the air flow. Therefore there is no need to control the mixing ratio of the fuel and the air, and the fuel can be completely burned by simple operation. Also there is no need to supply the fuel by large power as in the conventional injection method, thereby power can be saved and few troubles will be caused. When a static mixer is placed in a inner cylinder of double combustion cylinders, solid particles contained in the atomized fuel can be refined, mixed and dispersed, consequently completely burned.

What is claimed is:

1. An atomizing type burner, comprising an air supply tube (111,103) for supplying air, a fuel supply tube (102) having an open end for supplying a fuel, a fuel atomizing nozzle (101) connected to the open end of the fuel supply tube (102) for atomizing the fuel, the fuel atomizing nozzle (101) being placed within the air supply tube (11, 103), the air supply tube (103) having a double construction which includes an outer cylinder (115) and an inner cylinder (114) placed therein so as to form an air conduit (117) between the outer cylinder (115) and the inner cylinder (114) such that the air supplied in the air supply tube (11, 103) can flow through the air conduit (117), the inner cylinder (114) having a passage formed therein through which the fuel atomized by the fuel atomizing nozzle (101) and the air supplied in the air supply tube (11, 103) flow in combination, and wherein a static mixer (116) is formed within the inner cylinder (114).

2. An atomizing type burner according to claim 1, wherein the static mixer (116) is formed by a plurality of bars (126) wherein each of the bars (126) is a triangle in cross section and each of the bars (126) is arranged in such a manner that one of its edges is directed downwards.

3. An atomizing type burner according to claim 2, wherein each of the bars (126) is fixed at one of its ends to an inner surface of the inner cylinder (114) and the bars (126) are arranged in a spiral manner to form a spiral flow within the inner cylinder.

4. An atomizing type burner, comprising an air supply tube (11, 103) for supplying air, a fuel supply tube (102) having an open end for supplying a fuel, a fuel atomizing nozzle (101) connected to the open end of the fuel supply tube (102) for atomizing the fuel, the fuel atomizing nozzle (101) being placed within the air supply tube (11, 103), the air supply tube (103) having a double construction which includes an outer cylinder (115) and an inner cylinder (114) placed therein so as to form an air conduit (117) between the outer cylinder (115) and the inner cylinder (114) such that the air supplied in the air supply tube (11, 103) can flow through the air conduit (117), the inner cylinder (114) having a passage formed therein through which the fuel atomized by the fuel atomizing nozzle (101) and the air supplied in the air supply tube (11, 103) flow in combination, and wherein the inner cylinder (114) has an end inner surface (114a) which tapers outwards, and has an extension, and the outer cylinder (115) has an end outer surface (115a) which tapers inwards, and the end outer surface (115a) of the outer cylinder (115) has a tip which coincides with the extension of the end inner surface (114a) of the inner cylinder (114).

5. An atomizing type burner, comprising an air supply tube (11, 103) for supplying air, a fuel supply tube (102) having an open end for supplying a fuel, a fuel atomizing nozzle (101) connected to the open end of the fuel supply tube (102) for atomizing the fuel, the fuel atomizing nozzle (101) being placed within the air supply tube (11, 103), the air supply tube (103) having a double construction which includes an outer cylinder (115) and an inner cylinder (114) placed therein so as to form an air conduit (117) between the outer cylinder (115) and the inner cylinder (114) such that the air supplied in the air supply tube (11, 103) can flow through the air conduit (117), the inner cylinder (114) having a passage formed therein through which the fuel atomized by the fuel atomizing nozzle (101) and the air supplied in the air supply tube (11, 103) flow in combination, said burner being in combination with an apparatus for treating a combustible liquid, in which said apparatus comprises a furnace (1), a heat exchanger (3A) connected to the furnace (1) for receiving heat from a hot gas produced in the furnace (1) and heating the combustible liquid so as to vapourize water, a generator (3B) connected to the heat exchanger (3A) for generating the vapourized water therein, and a heater (7) placed at the upper portion of the furnace (1) and connected to the generator (3B) for heating the vapourized water before the vapourized water enters into the furnace (1), wherein the atomizing type burner is placed in the furnace (1) burning a fuel.

6. An atomizing type burner according to claim 5, wherein a static mixer (116) is formed within the inner cylinder (114).

7. An atomizing type burner according to claim 6, wherein the static mixer (116) is formed by a plurality of bars (126) wherein each of the bars (126) is a triangle in cross section and each of the bars (126) is arranged in such a manner that one of its edges is directed downwards.

8. An atomizing type burner according to claim 7, wherein each of the bars (126) is fixed at one of its ends to an inner surface of the inner cylinder (114) and the bars (126) are arranged in a spiral manner to form a spiral flow within the inner cylinder.

* * * * *